United States Patent
Fink et al.

(10) Patent No.: US 10,372,716 B2
(45) Date of Patent: *Aug. 6, 2019

(54) AUTOMATIC DISCOVERY AND PRESENTATION OF TOPIC SUMMARIES RELATED TO A SELECTION OF TEXT

(71) Applicant: International Business Machines Corporation, Armonk, NY (US)

(72) Inventors: Patrick W. Fink, Charlotte, NC (US); Philip E. Parker, York, SC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/622,072

(22) Filed: Feb. 13, 2015

(65) Prior Publication Data

US 2015/0269145 A1 Sep. 24, 2015

Related U.S. Application Data

(63) Continuation of application No. 14/218,795, filed on Mar. 18, 2014.

(51) Int. Cl.
*G06F 17/27* (2006.01)
*G06F 16/2457* (2019.01)

(52) U.S. Cl.
CPC ...... *G06F 16/24578* (2019.01); *G06F 17/278* (2013.01); *G06F 17/2785* (2013.01)

(58) Field of Classification Search
None
See application file for complete search history.

(56) References Cited

U.S. PATENT DOCUMENTS

| | | | | |
|---|---|---|---|---|
| 5,960,383 A | * | 9/1999 | Fleischer | G06F 17/277 704/9 |
| 6,167,368 A | * | 12/2000 | Wacholder | G06F 17/271 704/9 |

(Continued)

FOREIGN PATENT DOCUMENTS

WO 0029985 A1 5/2000

OTHER PUBLICATIONS ip.com et al.; "Determining Information Associated with an Extracted Portion of Content", IP.com No. IPCOM000219221D IP.com Electronic Publication: Jun. 26, 2012.

(Continued)

*Primary Examiner* — James Trujillo
*Assistant Examiner* — Cheryl M Shechtman
(74) *Attorney, Agent, or Firm* — Patterson + Sheridan, LLP

(57) ABSTRACT

Topic summaries related to a selection of text in an electronic document may be generated and presented. A topic summary application receives the user-selected text and identifies entities in the text using natural language processing. Using natural language processing, the summary application also identifies related entities and associated text phrases in a remaining portion of the electronic document. The remaining portion may be a portion of the document that precedes the user-selected text, so that a summary generated therefrom may be used to refresh the memory of the user while not revealing information that the user has not yet encountered. In addition, the summary application determines semantically important text phrases using text analytics and generates a summary, presented to the user in a pop-up window, of most frequently correlated related entities along with text phrases that are semantically important.

10 Claims, 3 Drawing Sheets

(56) References Cited

U.S. PATENT DOCUMENTS

| | | |
|---|---|---|
| 7,130,837 B2 | 10/2006 | Tsochantaridis et al. |
| 7,451,395 B2 | 11/2008 | Brants et al. |
| 7,607,083 B2 | 10/2009 | Gong et al. |
| 7,912,849 B2 | 3/2011 | Ohrn et al. |
| 8,032,827 B2 | 10/2011 | Melander et al. |
| 8,347,237 B2 | 1/2013 | Bier et al. |
| 8,370,278 B2 | 2/2013 | Vadlamani et al. |
| 2004/0225667 A1* | 11/2004 | Hu .................... G06F 17/30719 707/100 |
| 2007/0027865 A1* | 2/2007 | Bartz .................. G06F 17/2785 |
| 2008/0082499 A1* | 4/2008 | Koski ............... G06F 17/30719 |
| 2011/0314018 A1 | 12/2011 | Bieniosek et al. |
| 2012/0078613 A1* | 3/2012 | Kandekar ........... G06F 17/2745 704/9 |
| 2012/0197630 A1 | 8/2012 | Lyons et al. |
| 2013/0262092 A1 | 10/2013 | Wasick |
| 2014/0101544 A1* | 4/2014 | Albrecht ............... G06F 17/278 715/273 |
| 2014/0115527 A1* | 4/2014 | Pepper .................. G06Q 10/10 715/781 |
| 2015/0178266 A1* | 6/2015 | Navrides ........... G06F 17/30719 715/254 |

OTHER PUBLICATIONS

Hou et al.; "Development and Application of Optimization Model for Customized Text Summarization Framework", Proceedings of the 2013 IEEE 17th International Conference on Computer Supported Cooperative Work in Design.

Dink et al.: "Automatic Discovery and Presentation of Topic Summaries Related to a Selection of Text", U.S. Appl. No. 14/218,795, filed Mar. 18, 2014.

Liu, Shuhua; "Enhancing E-Business-Intelligent-Service: A Topic-Guided Text Summarization Framework", Proceedings of the Seventh IEEE International Conference on E-Commerce Technology (CEC'05).

* cited by examiner

AUTOMATIC DISCOVERY AND PRESENTATION OF TOPIC SUMMARIES RELATED TO A SELECTION OF TEXT

CROSS-REFERENCE TO RELATED APPLICATION

This application is a continuation of co-pending U.S. patent application Ser. No. 14/218,795, filed Mar. 18, 2014. The aforementioned related patent application is herein incorporated by reference in its entirety.

BACKGROUND

Field of the Invention

The present invention relates to text processing, and more specifically, to automatic discovery and presentation of topic summaries within a document related to a selection of text.

Description of the Related Art

Electronic documents such as Microsoft® Word documents, portable document format (PDF) files, and web pages have become increasingly common. Many forms of traditional print media, from novels to newspapers, are now available in these (and other) electronic formats.

An individual reading one part of an electronic document may encounter a person, item, concept, etc. that is elaborated upon elsewhere in the document. Consider a news article presented via a webpage. People and things referenced in one part of the article may be introduced in a much earlier part of the article or even on another webpage accessible through a hyperlink. In such a case, the reader may be required to return to the earlier part of the article or the other webpage if the reader does not recall the people or things currently being referenced. This can be inconvenient to readers.

SUMMARY

One embodiment of the invention provides a computer implemented method for processing text. The method generally includes receiving a selected portion of text in a document and determining at least a first entity referenced in the selected portion. The method also includes evaluating a remaining portion of text in the document to identify text content relating to the first entity. In addition, the method includes generating, from the identified text content relating to the first entity, a summary of the first entity and displaying the summary on a display screen.

Other embodiments include, without limitation, a computer-readable medium that includes instructions that enable a processing unit to implement one or more aspects of the disclosed method as well as a system configured to implement one or more embodiments of the disclosed method.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments disclosed herein provide techniques for discovering and presenting topic summaries related to a selection of text in an electronic document. In response to receiving user-selected text in the electronic document, a topic summary application uses natural language processing to identify an entity in the user-selected text. The summary application also uses natural language processing to analyze a remaining portion (which may itself include multiple portions) of the text and build knowledge about the identified entity in the user-selected text. The summary application then presents to the user an abstract view summarizing the knowledge about the identified entity. In some cases, the remaining portion may be limited to parts of the text that precede the user-selected text. In such a case, the summary generated from the remaining portion may be used to refresh the memory of the user, while not revealing information the user has not yet encountered (e.g., the name of a culprit in a mystery novel).

In one embodiment, the summary application may identify related entities and associated text phrases for the summary by removing filler or statistically common words such as "the," "and," "of," etc. from sentences which include the entity identified from the user-selected text. The summary application may then take remaining clauses which are subjects (or targets) to be the related entities. Other text which is relevant to the identified entity itself and/or the related entities may be taken as the associated text phrases. After identifying the related entities and associated text phrases, the summary application may further determine semantically important text phrases so that important text phrases are presented to the user. In one embodiment, the summary application may determine semantically important text phrases using text analytics, with text phrases that are repeated often considered more important, and vice versa. Using this approach, the summary application may rank the text phrases. The summary application may then include in the summary frequently correlated related entities along and associated text phrases that are semantically important (i.e., highly ranked). Due to limited screen space, semantically important text phrases may be ranked, with less important text phrases being culled from display. Such a summary may be presented to the user via, e.g., a pop-up window.

Figure 1:
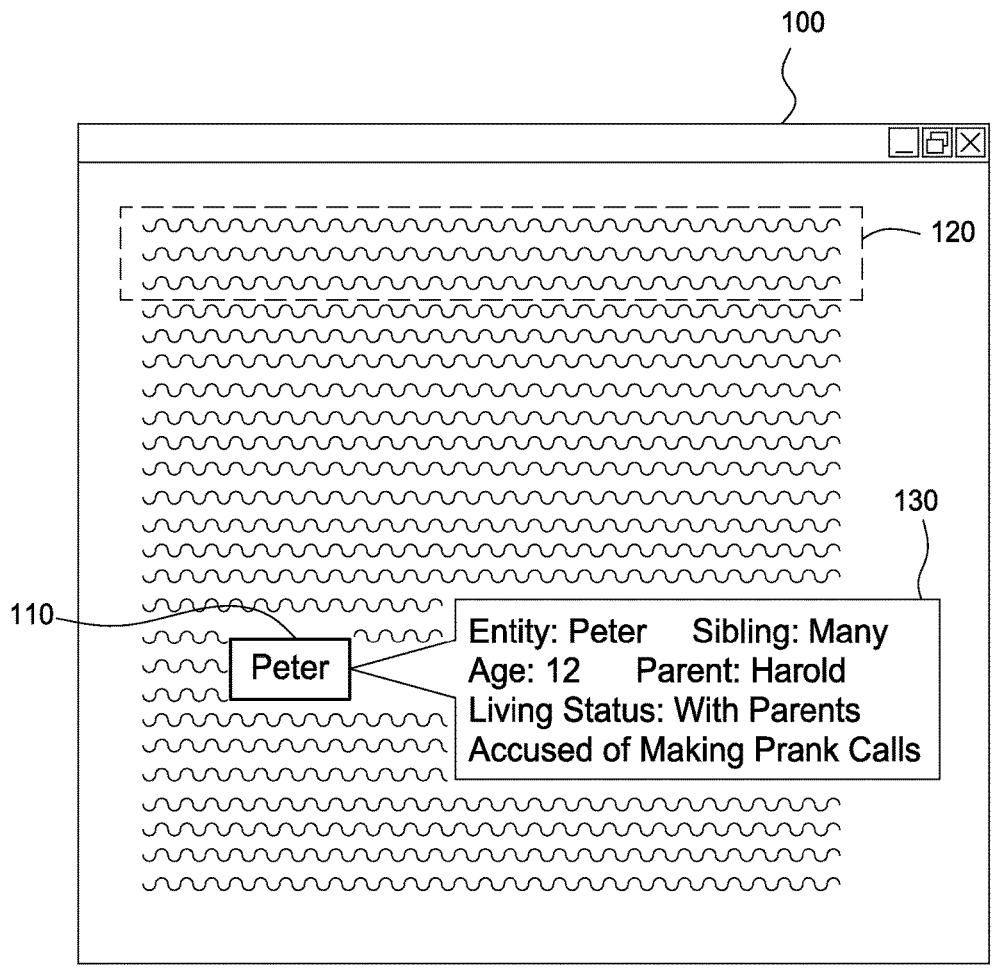
FIG. 1 illustrates an approach for generating a summary for user-selected text, according to an embodiment.

FIG. 1 illustrates an approach for generating a summary for user-selected text, according to an embodiment. As shown, a user interface 100 presents text of an electronic document 105 to a user. The electronic document 105 may be any electronic file or files capable of distributing textual information. For example, the electronic document may be a Microsoft® Word document, a PDF file, a webpage, or the like.

Consider the electronic document text "Peter Thompson, age 12, is accused of making prank calls. Prank calls were made to Al Anderson, Bill Beverly, and Calvin Carroll. Peter lives with parent Harold Thompson at a home on Sycamore Street. The prank calls were traced to his house." Illustratively, the user selects text "Peter" 110 in the electronic document 105. The user may select "Peter" 110 by highlighting the text, hovering a screen pointer over the text, or in any other feasible manner. In response to receiving the user-selected text, a topic summary application identifies the entity "Peter Thompson" in the selected text and generates the pop-up window 130 which provides a summary of the identified entity based on prior text 120 in the electronic document that is relevant to "Peter Thompson."

Although one portion of prior text 120 is shown, the summary application may generally identify any number of different entities related to "Peter Thompson," as well as text associated with "Peter Thompson" and/or the related entities. The associated text may, e.g., describe the relationship between the identified entity "Peter Thompson" and the related entities. Both the identification of the entity "Peter Thompson" and the identification of related entities may be achieved using natural language processing techniques. For example, the summary application may identify related entities by removing filler or statistically common words such as "and," "the," and "or" from sentences that include "Peter" or "Peter Thompson" and taking noun phrases in the remaining clauses to be related entities. The related entities may be stored in a data structure that also stores associated text phrases which may include, e.g., sentences, clauses, etc. having the related entities and/or the identified entity. Illustratively, the associated text phrases may include phrases about the age and living status of "Peter Thompson," as well text phrases identifying the relationship between "Peter Thompson" and related entities (e.g., that "Harold" is a parent of "Peter Thompson").

After identifying the related entities and associated text phrases, the summary application may further determine most semantically important text phrases so that only important text phrases are presented in the summary 130. More specifically, the summary application may rank the text phrases according to semantic importance, and select one or more of the highly ranked text phrases to present in the summary 130. In one embodiment, the summary application may determine semantically important text phrases based on the frequency of occurrence of the text phrases. For example, if "Peter" or "Peter Thompson" is repeatedly mentioned as having "Harold Thompson" as a parent, then the text phrases which include this mention of his parents may be considered more semantically important.

The summary application may then generate a summary of frequently correlated related entities along with semantically important text phrases. In one embodiment, correlation between entities may be determined based on the number of times that entities appear together in sentences. For example, if "Peter" or "Peter Thompson" is frequently mentioned in the same sentence as his parents, his parents may be frequently correlated entities. The summary 130 may then include his parent's names as well as the text phrases that name "Harold Thompson" as Peter's parent. In addition, the summary application may shorten the text phrases themselves so that, for example, only "Parent: Harold Thompson" is presented to the user, as opposed to entire sentences from the original text that mention Peter as being the son of Harold Thompson. The resulting summary 130 is presented to provide reader assistance and, in particular, to refresh the user's memory regarding the user-selected text "Peter" 110.

Figure 2:
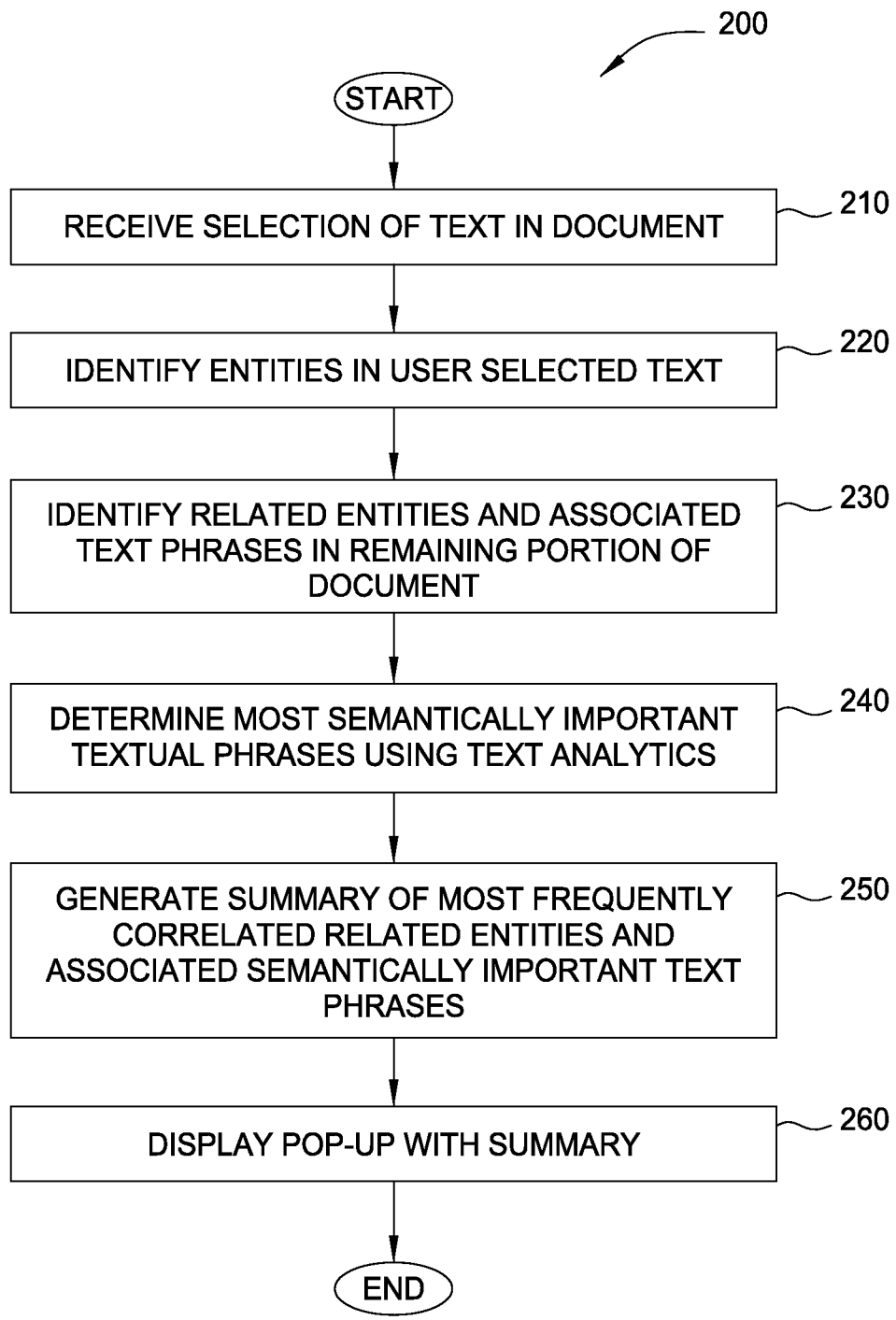
FIG. 2 illustrates a method for processing text to generate a topic summary, according to an embodiment.

FIG. 2 illustrates a method 200 for processing text to generate a topic summary, according to an embodiment. As shown, the method 200 begins at step 210, where a summary application receives a user selection of text in a document. As discussed, the document may be any electronic document that includes text, such as a Microsoft® Word document, a portable document format (PDF) file, or a web page. The user may select text in the electronic document in any feasible manner. For example, the user may highlight the text or hover a screen pointer over the text.

At step 220, the summary application identifies entities in the user-selected text. The entities may be identified using natural language processing. For example, the reader may select a mention of the first name "Peter" of a person or character, and the summary application may use natural language processing to determine a corresponding entity "Peter Thompson" that is mentioned throughout the document. In one embodiment, the natural language processing may be based on the subject-verb-target structure of English sentences. For example, if the first name "Peter" is the subject of one sentence and the full name "Peter Thompson" is the subject of another sentence, the summary application may identify "Peter Thompson" as the entity with "Peter" being a reference to the same entity. A field of study in natural language processing is concerned with properly determining the target of pronouns/same entities (also known as appositives). Of course, other natural language processing techniques, including well-known techniques for entity recognition, may be used instead to identify entities in the user-selected text.

At step 230, the summary application identifies related entities and associated text phrases in a remaining portion of the electronic document. Related entities may include subjects (or targets) that the summary application determines is related to the identified entity. Continuing the example above, in which "Peter Thompson" is identified as the entity in user-selected text, entities related to "Peter Thompson" may include parents, siblings, friends, and the like. The associated text phrases may include factoids associated with the related entities and/or the identified entity itself. For example, the associated text phrases may include text providing age or living status of "Peter Thompson," text describing the relationships between "Peter Thompson" and related entities, etc.

Similar to identifying entities in user-selected text, the summary application may use natural language processing to identify related entities and text phrases. As discussed, the natural language processing may be based on the subject-verb-target structure of English sentences in one embodiment. In such a case, the summary application may determine that the identified entity (e.g., "Peter Thompson") appears in the subject or target of a sentence, and then take the target or subject of the sentence, respectively, as a related entity. Typically, the subjects and targets may be noun phrases such that a sentence can be decomposed into a subject, verb, and target (of the verb). The target(s) of one sentence may appear as subject(s) of other sentences, allowing additional factoids to be gathered and a more complete picture developed. For example, the summary application may determine that "Peter Thompson" is the subject of the sentence "Peter lives with parent Harold Thompson" and take the target "parent Harold Thompson" to be a related entity. The summary application may store the related entities in a data structure. The summary application may also store the text phrase "Peter lives with parent Harold Thompson" itself in the data structure as a text phrase that is associated with the related entity "Harold Thompson."

In another embodiment, the summary application may remove filler or statistically common words such as "and," "of" and "the" in sentences which include an entity, and search for interesting phrases and entities in the remaining clauses. For example, the summary application may parse the sentence "Peter lives with parent Harold Thompson," remove the filler and common words "with" and "and," and extract "Harold Thompson" as an entity. In yet another embodiment, distance relationships may be used to determine related entities and text phrases. The distance relationships may include linear distances between words in a word group such as a sentence or a paragraph. For example, the summary application may consider word counts between entities to determine distance relationships. Distance relationships provide a syntactic (document position) approach, as opposed to a semantic (meaning) approach, for determine related entities. In further embodiments, other natural language processing techniques may be used to identify related entities and text phrases.

In one embodiment, the summary application may identify related entities and associated text phrases in a portion of the document that precedes the user-selected text. For example, a user may select, towards the end of a document, text that references a person or term defined in an earlier portion of the document that the user has forgotten. In response, the summary application may identify related entities and associated text phrases in the earlier portion of the document. The summary application may then generate a summary using the related entities and associated text phrases to help refresh the user's memory.

In yet another embodiment, the summary application may identify related entities and associated text phrases in other pages, documents, etc. that are linked from the electronic document. For example, the electronic document may provide links to other documents that define or elaborate upon certain people, terms, etc., and the summary application may identify related entities and associated text in those other documents. As another example, an online article may include a number of web pages that are accessed by following successive links, and the summary application may follow such links back to identify related entities and associated text phrases in prior pages of the article.

At step 240, the summary application determines the most semantically important text phrases using text analytics. For example, the summary application may rank the text phrases according to semantic importance, and select one or more of the highly ranked text phrases as the semantically important text phrases. The summary application may identify a large number of text phrases associated with related entities at step 230. Step 240 would then be applied to reduce the number of text phrases so that a limited number of short text phrases may be are added to a summary, discussed below.

In one embodiment, the summary application may determine semantic importance of a text phrase based on the number of times the text phrase, or similar phrases, appear in the document. In such a case, the summary application may choose the text phrases that appear most often in the document as the most semantically important text phrases. For example, "Peter made prank calls" and similar text phrases may be repeated throughout a news article, and the summary application may determine such a phrase to be an important text phrase. In alternative embodiments, other text analytic techniques may be applied to rank text phrases and determine most semantically important text phrases.

At step 250, the summary application generates a summary of most frequently correlated related entities and semantically important text phrases. Such a summary may provide an overview of an entity in the selected text, entities that are related to the entity in the user-selected text, as well as what specifically the relationships are in the document. In one embodiment, the summary may take the most frequently correlated related entities to be related entities, determined at step 230, that appear most often in the same sentence (or, alternatively, paragraph, section, etc.) as the entity identified in the user-selected text. For example, if "Peter Thompson" is the identified entity and "Peter" or "Peter Thompson" frequently appears in the same sentence with his parents' names or mention of parents, then the summary application may include the parents and associated semantically important text phrases in the summary. The summary application may select a given number (e.g., 5) of such most frequently correlated related entities to include in the summary.

In another embodiment, the summary application may select entities and semantically important text phrases based, at least in part, on user history. For example, the user may be particularly interested in family relationships and select various sentences which include the names of the "Thompson" family. In such a case, the summary application may add to the summary, or make more prominent in the summary, information about family relationships.

In yet another embodiment, the summary application may paraphrase, shorten, or otherwise summarize the semantically important text phrases to include in the summary. Any feasible technique, including well-known techniques, may be used summarize the semantically important text phrases. For example, the summary application may determine the semantically important text phrases to include "Peter Thompson, age 12, is accused of making prank calls. Peter lives at home with parent Harold Thompson." The summary application may then break these sentences down into a number of shorter phrases, such as "Age: 12," "Parent: Harold Thompson," "Lives at home," "Accused of making prank calls," etc. to include in the summary.

At step 260, the summary application displays a pop-up window which includes the summary generated at step 250. In response to receiving user-selected text, the summary application may automatically generate the summary pop-up window and display the pop-up window to the user. Doing so provides assistance to users trying to understand or recall terms or phrases in electronic documents. In alternative embodiments, the summary may be displayed without a pop-up window. For example, the summary may be displayed on a side panel of the same window, or the like.

Figure 3:
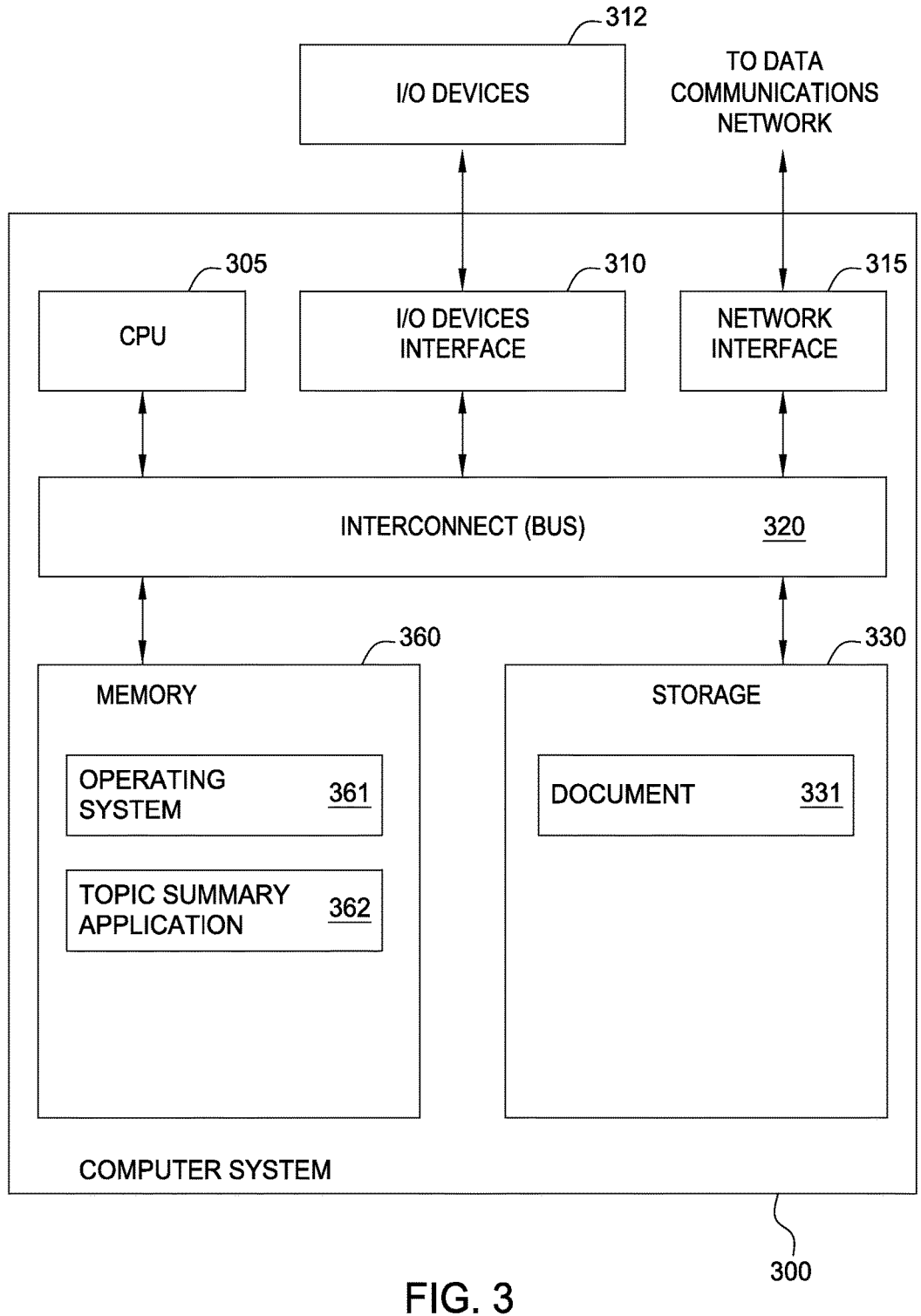
FIG. 3 illustrates a system in which an embodiment may be implemented.

FIG. 3 illustrates a system 300 in which an embodiment may be implemented. As shown, the system 300 includes, without limitation, a central processing unit (CPU) 305, a network interface 315, an interconnect 320, a memory 360, and storage 330. The system 300 may also include an I/O device interface 310 connecting I/O devices 312 (e.g., keyboard, display and mouse devices) to the system 300.

The CPU 305 retrieves and executes programming instructions stored in the memory 360. Similarly, the CPU 305 stores and retrieves application data residing in the memory 360. The interconnect 320 facilitates transmission, such as of programming instructions and application data, between the CPU 305, I/O device interface 310, storage 330, network interface 315, and memory 360. CPU 305 is included to be representative of a single CPU, multiple CPUs, a single CPU having multiple processing cores, and the like. And the memory 360 is generally included to be representative of a random access memory. The storage 330 may be a disk drive storage device. Although shown as a single unit, the storage 320 may be a combination of fixed and/or removable storage devices, such as magnetic disk drives, flash drives, removable memory cards or optical storage, network attached storage (NAS), or a storage area-network (SAN). Further, system 300 is included to be representative of a physical computing system as well as virtual machine instances hosted on a set of underlying physical computing systems. Further still, although shown as a single computing system, one of ordinary skill in the art will recognized that the components of the system 300 shown in FIG. 3 may be distributed across multiple computing systems connected by a data communications network.

As shown, the memory 360 includes an operating system 361 and a topic summary application 362 and storage 330 includes a document 331. Illustratively, the operating system 361 may include Microsoft Windows®. The topic summary application 362 is configured to receive a selection of text in an document 331 and generate a summary of entities mentioned in the selected text. In one embodiment, the topic summary application 362 may receive the selection of text, identify entities using natural language processing, identify related entities and associated text phrases in a remaining portion of the document, determine most semantically important text phrases using text analytics, generate a summary of most frequently correlated related entities and semantically important text phrases, and display a pop-up which includes the summary, according to the method 200 discussed above.

Although discussed above primarily with respect to text, some embodiments may also handle images, videos, etc. For example, the summary application may identify an image related to an entity in user-selected text, based on image metadata or surrounding text, and include the image in the pop-up window summary that is presented to the user.

Advantageously, techniques disclosed herein provide assistance to readers of electronic documents. In response to a user selecting text by, e.g., highlighting or hovering a screen pointer over the text, a topic summary application identifies and generates a pop-up with a summary of entities in the user-selected text. The summary may include a list of related entities and associated text phrases that appear in a portion of the electronic document prior to the user-selected text. Such a summary can help refresh the user's memory about the entity. At the same time, the summary may not provide new information that the user has not yet encountered. For example, if the electronic document is a mystery novel, the summary would not reveal the identity of a culprit who is named later in the electronic document.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., topic summary application 362) or related data available in the cloud. For example, the topic summary application 362 could execute on a computing system in the cloud and generate a summary of entities in user-selected text in an electronic document that is stored at a storage location in the cloud. In such a case, the topic summary application 362 may receive the selection of text, identify entities in the selected text using natural language processing, identify related entities and associated text phrases in a remaining portion of the document, determine most semantically important text phrases using text analytics, and generate a summary of most frequently correlated related entities and semantically important text phrases. Doing so allows a user to access the summary from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer implemented method for processing text, the method comprising:
    receiving a selected portion of text in a document;
    determining at least a first entity referenced in the selected portion;
    evaluating a remaining portion of text excluding the selected portion in the document and one or more other documents accessible via links in the document to identify text content relating to and excluding the first entity in the document and the one or more other documents, wherein the identified text content comprises second entities within a distance of the first entity in the document and the one or more other documents;
    generating, from the identified text content relating to and excluding the first entity, a summary of the first entity, wherein the summary of the first entity comprises a plurality of truncated phrases generated from the identified text content selected based, at least in part, on a history of previous selections of text; and
    displaying the summary on a display screen by generating a popup window including the summary.

2. The method of claim 1, wherein generating the summary of the first entity includes:
    identifying entities related to the first entity and associated text phrases in the remaining portion of text in the document, and
    ranking the associated text phrases in the remaining portion of text in the document based on semantic meaning, and
    wherein the summary includes one or more of the related entities and associated text phrases chosen based on the ranking.

3. The method of claim 2, wherein the related entities are identified through natural language processing.

4. The method of claim 3, wherein the natural language processing removes filler and statistically common words in sentences which include the identified entity, and one or more remaining clauses in the sentences are identified as the related entities.

5. The method of claim 2, wherein ranking the associated text phrases is performed using text analytics.

6. The method of claim 5, wherein the ranking of the associated text phrases is based on number of times the associated text phrases or similar phrases appear in the document.

7. The method of claim 2, wherein the one or more related entities included in the summary are frequently correlated entities determined based on number of times the one or more related entities occur in same sentences as the identified entity.

8. The method of claim 1, wherein the remaining portion comprises text content of the document preceding the selected portion of text in the document.

9. The method of claim 1, wherein the summary is displayed in a pop-up user interface.

10. The method of claim 1, wherein the summary is generated based on a prior usage history of a user.

* * * * *